(12) United States Patent
Visweswaran et al.

(10) Patent No.: US 11,480,655 B2
(45) Date of Patent: Oct. 25, 2022

(54) TRANSMITTER-RECEIVER LEAKAGE SUPPRESSION IN INTEGRATED RADAR SYSTEMS

(71) Applicant: IMEC VZW, Leuven (BE)

(72) Inventors: Akshay Visweswaran, Heverlee (BE); Kristof Vaesen, Mortsel (BE)

(73) Assignee: IMEC VZW, Leuven (BE)

( * ) Notice: Subject to any disclaimer, the term of this patent is extended or adjusted under 35 U.S.C. 154(b) by 381 days.

(21) Appl. No.: 16/789,774

(22) Filed: Feb. 13, 2020

(65) Prior Publication Data
US 2020/0264272 A1    Aug. 20, 2020

(30) Foreign Application Priority Data
Feb. 14, 2019 (EP) ..................................... 19157207

(51) Int. Cl.
   *G01S 7/03*     (2006.01)
   *G01S 7/35*     (2006.01)
   *H01Q 1/24*     (2006.01)

(52) U.S. Cl.
   CPC .............. *G01S 7/038* (2013.01); *G01S 7/354* (2013.01); *H01Q 1/247* (2013.01)

(58) Field of Classification Search
   None
   See application file for complete search history.

(56) References Cited

U.S. PATENT DOCUMENTS

| | | | |
|---|---|---|---|
| 2003/0148750 A1* | 8/2003 | Yan ....................... | H04B 1/0032 455/305 |
| 2010/0159837 A1* | 6/2010 | Dent ...................... | H04B 1/525 455/63.1 |

(Continued)

FOREIGN PATENT DOCUMENTS

EP    2960672 A1    12/2015

OTHER PUBLICATIONS

Park, Junhyeong, Seungwoon Park, and Seong-Ook Park. "Leakage Mitigation and Internal Delay Compensation in FMCW Radar for Small Drone Detection." arXiv preprint arXiv:1807.06324 (2018).

(Continued)

*Primary Examiner* — Whitney Moore
(74) *Attorney, Agent, or Firm* — McDonnell Boehnen Hulbert & Berghoff LLP

(57) ABSTRACT

Example embodiments relate to transmitter-receiver leakage suppression in integrated radar systems. One embodiment includes a front-end for a radar system. The front-end includes a transmit path that includes a power amplifier and a transmit antenna. The transmit path is configured to transmit a transmit signal. The front-end also includes a receive path that includes a receive antenna and a low-noise amplifier. The receive path is configured to receive at least a leakage from the transmit path. The receive path is configured to generate an amplified signal of the leakage. Further, the front-end also includes a reference path. In addition, the front-end includes a compensation unit in the reference path. The compensation unit is configured to generate compensation for a leakage path between the transmit path and the receive path. The compensation unit is configured to apply the generated compensation to the reference signal to generate a compensated reference signal.

15 Claims, 8 Drawing Sheets

(56) References Cited

U.S. PATENT DOCUMENTS

2017/0146646 A1* 5/2017 Nakabayashi .......... G01S 13/34
2017/0153318 A1   6/2017 Melzer et al.
2019/0250246 A1* 8/2019 Murakami .............. G01S 13/34

OTHER PUBLICATIONS

Melzer, Alexander, Alexander Onic, Florian Starzer, and Mario Huemer. "Short-range leakage cancelation in FMCW radar transceivers using an artificial on-chip target." IEEE Journal of selected topics in signal processing 9, No. 8 (2015): 1650-1660.

Lin, Kaihui, Yuanxun Ethan Wang, Cheng-Keng Pao, and Yi-Chi Shih. "A Ka-band FMCW radar front-end with adaptive leakage cancellation." IEEE Transactions on Microwave Theory and Techniques 54, No. 12 (2006): 4041-4048.

Visweswaran, Akshay, Kristof Vaesen, Siddhartha Sinha, Ilja Ocket, Miguel Glassee, Claude Desset, Andre Bourdoux, and Piet Wambacq. "9.4 A 145GHz FMCW-radar transceiver in 28nm CMOS." In 2019 IEEE International Solid-State Circuits Conference—(ISSCC), pp. 168-170. IEEE, 2019.

European Search Report, European Patent Application No. 19157207.2, dated Aug. 2, 2019, 7 pages.

\* cited by examiner

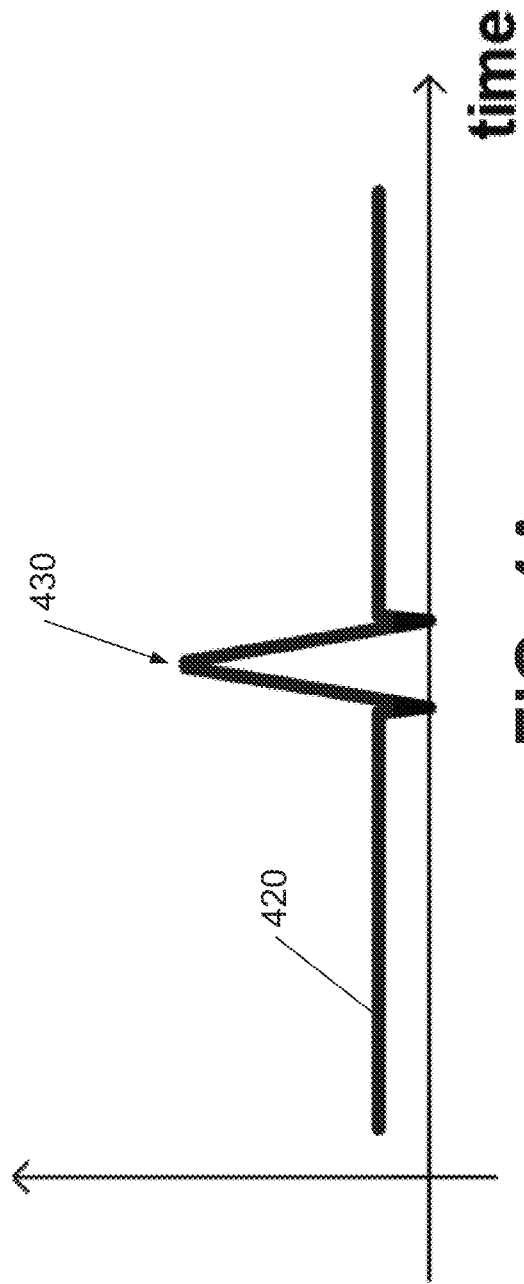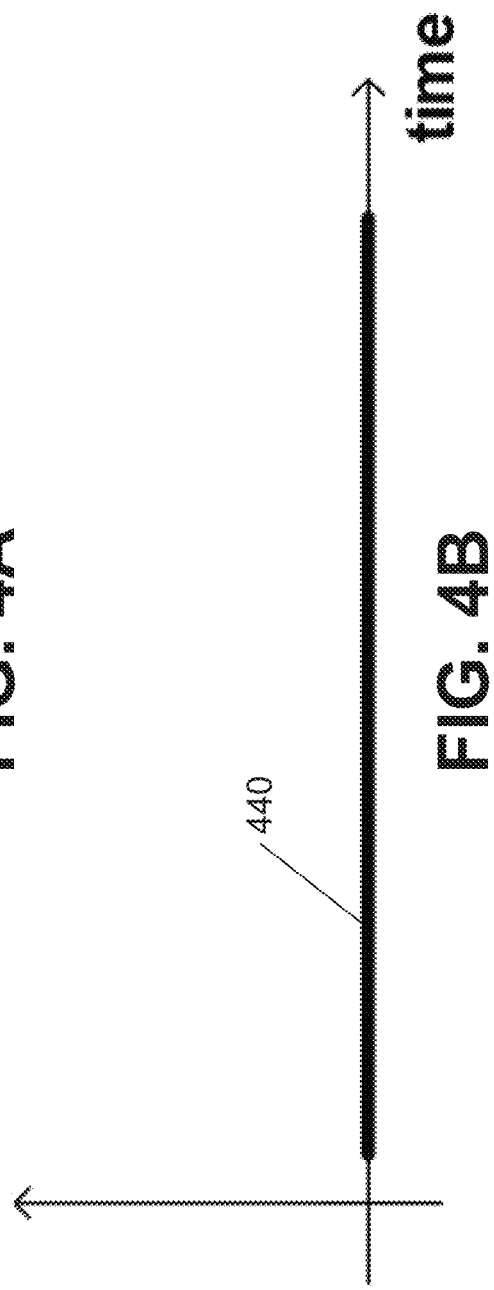

TRANSMITTER-RECEIVER LEAKAGE SUPPRESSION IN INTEGRATED RADAR SYSTEMS

CROSS-REFERENCE TO RELATED APPLICATIONS

The present application is a non-provisional patent application claiming priority to European Patent Application No. EP 19157207.2, filed Feb. 14, 2019, the contents of which are hereby incorporated by reference.

FIELD OF THE DISCLOSURE

The present disclosure relates to transmitter-receiver leakage suppression in integrated radar systems, and is more particularly concerned with integrated millimeter-wave frequency-modulated continuous wave radar systems.

BACKGROUND

Millimeter-wave radar systems are of growing interest as scaling of the radio frequency provides power-efficient broadband radar circuits. The key interest in such broadband radar circuits is that fine radar range resolution can be obtained.

However, in radar systems, there is a leakage signal path, or a spillover path, between the transmitter antenna and the receiver antenna. In a frequency-modulated continuous wave (FMCW) radar, the leakage signal, or spillover, gets correlated with the frequency modulated (FM) reference signal in the receiver, resulting in a beat frequency at intermediate frequency (IF). Delays in the transmit circuit, due to the power amplifier (PA), and delays in the receive circuit, due to the low-noise amplifier (LNA), can shift the leakage-beat into the passband of the receiver thereby saturating the receiver and producing ghost targets. This effect is exacerbated in millimeter-wave radar systems, especially when both the transmitter and receiver antennas are integrated on a single chip or off-chip on the same substrate.

The effect of leakage at millimeter-wave frequencies becomes more pronounced due to a greater path loss that results in reduced signal power from targets. Therefore, leakage can create fake targets or saturate the high-gain receiver.

The article by entitled "Short-Range Leakage Cancellation in FMCW Radar Transceivers Using an Artificial On-Chip Target" by Alexander Melzer, Alexander Onic, Florian Starzer and Mario Heumer, referred to hereinafter as Melzer et al. (IEEE Journal of Selected Topics in Signal Processing, Vol. 9, No. 8, pages 1650 to 1660, December 2015) and US-A-2017/0153318 disclose the use of an artificial on-chip target to mitigate short-range leakage in FMCW radar systems based on the cross-correlation properties of the residual phase noise in the intermediate frequency (IF) domain. The artificial on-chip target comprises a delay line having a significantly smaller delay than the round-trip delay time of the short-range leakage. A phase-locked loop is used to feed a chirp signal to both the artificial on-chip target and to a transmit channel. Reflections or echoes received from targets illuminated by the transmit channel are processed in isolation to the artificial on-chip target, the latter not being perturbed by other reflections and is only limited by the intrinsic noise. A leakage canceller is provided in the channel containing signals from the artificial on-chip target after it has been down-converted, the leakage canceller extracting decorrelated phase noise from an intermediate frequency (IF) signal of the artificial on-chip target to generate a cancellation signal. The cancellation signal is subtracted from the received radar signal in baseband.

Whilst both Melzer et al. and US-A-2017/0153318 are directed to addressing short range leakage, the solution they provide is complex and has a power cost because two receivers, as well as associated circuitry, are required. Moreover, the cancellation is performed in IF and no delay is implemented in the reference line or path branching off from the transmit signal path.

In the article entitled "Leakage Mitigation and Internal Delay Compensation in FMCW Radar for Small Drone Detection" by Junhyeong Park, Seungwoon Park and Seong-Ook Park, hereinafter referred to as Park et al. (School of Electrical Engineering, Korea Advanced Institute of Science and Technology (KAIST), Daejeon 34141, Republic of Korea), an FMCW radar system is described in which a down-conversion technique addresses phase noise of the leakage (which deteriorates the dynamic range) and internal delay (which decreases the maximum detectable range). In the disclosed down-conversion technique, there are two steps, namely, deramping or mixing and then down-converting the exact IF beat frequency of the leakage. The exact IF beat frequency and the exact constant phase are used to reduce the phase noise skirt and hence decrease the noise floor. Internal delay is compensated thereby preventing the reduction of the maximum detectable range, and after delay cancellation, the leakage can then be represented as a DC value.

However, the delay cancellation is performed in the frequency domain and the frequency of the local oscillator used changes constantly. As a result, the constant change may be tracked to be able to perform the cancellation calculation at any time. Moreover, leakage compensation tends to be sensitive to phase noise. Furthermore, as there are effectively two down-conversion steps, increasing the implementation complexity with additional costs in power consumption and the number of components.

SUMMARY

The present disclosure may provide a leakage cancellation in integrated FMCW radar systems which is straightforward to implement.

In accordance with one aspect of the present disclosure, there is provided a front-end for a radar system comprising:
  a transmit path including a power amplifier and a transmit antenna, the transmit path being configured for transmitting a transmit signal;
  a receive path including a receive antenna and a low-noise amplifier, the receive path being configured for receiving at least a leakage from the transmit path, and for generating an amplified signal thereof;
  a reference path derived from the transmit path and configured for generating a reference signal; and
  a mixer configured for mixing the amplified signal with the reference signal to generate an output signal at intermediate frequency;
  characterized in that the front-end further comprises a compensation unit in the reference path, the compensation unit being configured for generating compensation for a leakage path between the transmit path and the receive path and for applying the generated compensation to the reference signal to generate a compensated reference signal;
  and in that the front-end further comprises a leakage suppression filter in the receive path, the leakage suppression filter being configured for removing DC components in the output signal resulting from mixing the amplified signals with the compensated reference signal.

Such a front-end can fully compensate for a leakage path between the transmit antenna and the receive antenna and is particularly effective in frequency-modulated continuous wave radar systems.

In an embodiment, the compensation unit is further configured for compensating for delay in leakage propagation time due to at least the leakage between the transmit path and the receive path.

In this way, the delay in the leakage path can be fully compensated for in the intermediate frequency signal prior to further processing irrespective of whether a target is within the field-of-view of the radar system. This has the effect of removing the effect of leakage and phase noise at the intermediate frequency.

In addition, it is also possible to compensate for delays due to the power amplifier in the transmit path and the low-noise amplifier in the receive path as well as buffering in the reference path.

The front-end further comprises a control loop configured for determining maximum power at a modulating waveform frequency and for generating a corresponding adaptive delay due to that maximum power, the control loop including a power detector configured for determining the maximum power and a controller for adjusting the compensation unit in accordance with the determined maximum power.

Such a control loop optimizes leakage compensation based on the modulating waveform frequency so that an adaptive delay can be provided to compensate for maximum power thereat.

In an embodiment, the control loop is configured to be connected between the compensation unit and the output from the leakage suppression filter, the compensation in the reference path comprising a fixed delay and an adaptive delay.

In another embodiment, the front-end further comprises a delay unit in the transmit path, the delay unit being configured for applying a transmit delay to the at least one transmit signal, and wherein the control loop is configured to be connected between the compensation unit and the output from the mixer, the compensation in the reference path comprising a fixed delay, and the transmit delay corresponding to the adaptive delay.

In an embodiment, the compensation unit may comprise a programmable delay.

By having a programmable delay, the delay from the front-end can be compensated.

In an embodiment, compensation unit comprises a circuit including inverters and multiplexers.

In an embodiment, the leakage suppression filter is configured to suppress DC offsets and is configured to be combined with the mixer. The leakage suppression filter may be configured as a high pass filter.

In an embodiment, wherein the DC suppression filter comprises a voltage regulation loop.

In some embodiments, the front-end is implemented on a chip.

In accordance with another aspect of the present disclosure, there is provided a radar system comprising a front-end as described above.

In some embodiments, the radar system comprises a frequency-modulated continuous wave radar system.

In accordance with a further aspect of the present disclosure, there is provided a method of canceling transmitter leakage in a radar system, the method comprising:
transmitting a transmit signal from a transmit path;
receiving at least a leakage from the transmit path;
amplifying at least the leakage from the transmit path to generate an amplified signal thereof;
deriving a reference signal from the transmit path; and
mixing the amplified signal with the reference signal to generate an output signal at intermediate frequency;
characterized in that the method further comprises the steps of:
deriving a delay corresponding to a leakage path between the transmit path and the receive path;
generating a compensation for the derived delay;
applying the generated compensation to the reference signal; and
removing DC components from the output signal.

The method may further include the step of compensating for delay due to at least leakage propagation time between the transmit path and the receive path.

While the present disclosure also provides a method which can compensate for delay due to leakage propagation time between the transmit path and the receive path irrespective of whether a target is in the field-of-view of the system, it is also possible to apply compensation for delays due to the power amplifier in the transmit path and the low-noise amplifier in the receive path as well as buffering in the reference path.

BRIEF DESCRIPTION OF THE DRAWINGS

For a better understanding of the present disclosure, reference will now be made, by way of example, to the accompanying drawings.

FIG. 4A illustrates the effect of delay compensation in the receive chirp path of the FMCW radar system illustrated in FIGS. 3A-3C, according to example embodiments.

FIG. 4B illustrates the effect of delay compensation in the receive chirp path of the FMCW radar system illustrated in FIGS. 3A-3C, according to example embodiments.

DETAILED DESCRIPTION

Figure 1:
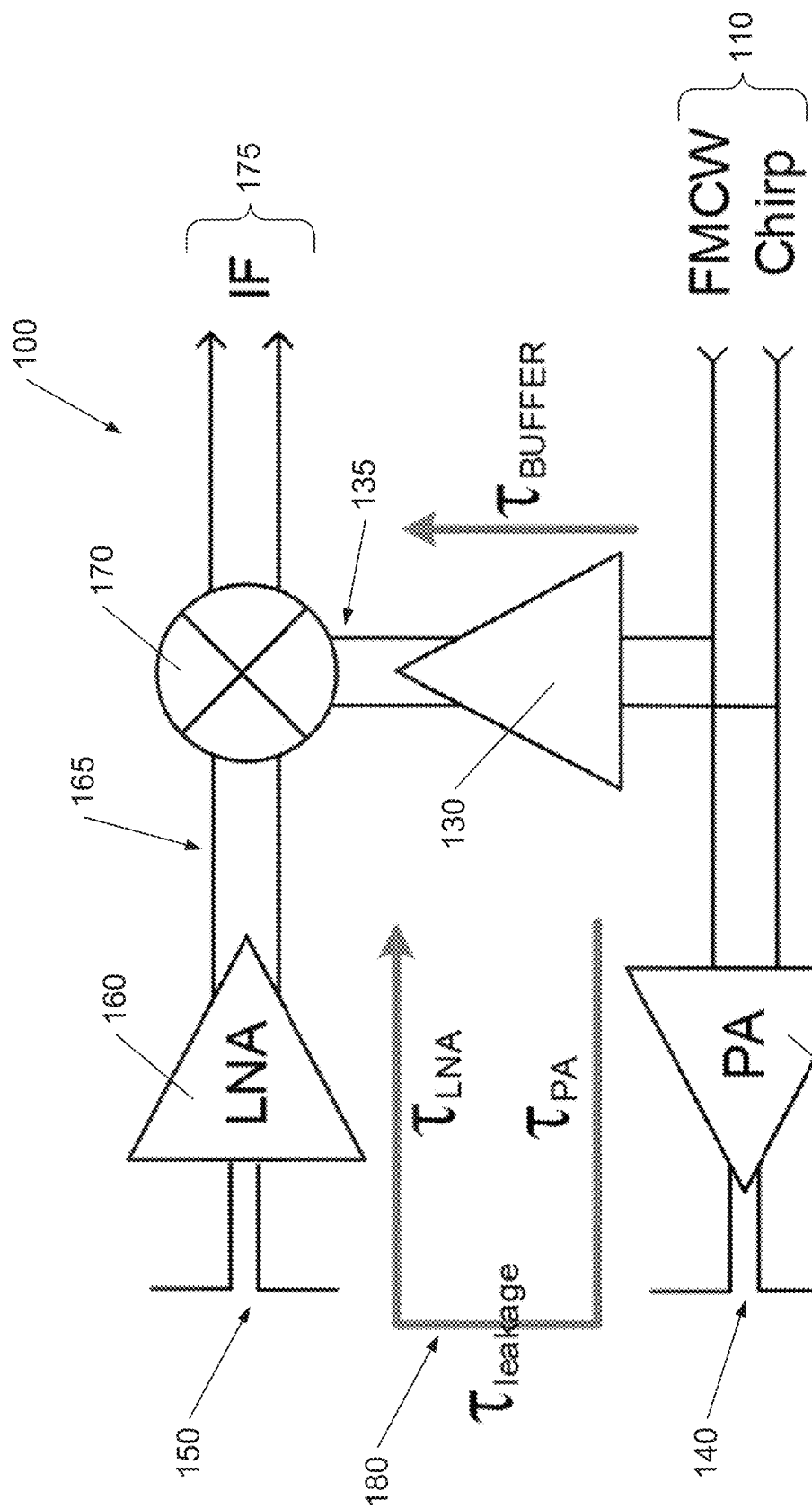
FIG. 1 illustrates a schematic diagram of a front-end of an FMCW radar system.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes.

FIG. 1 illustrates a schematic diagram of a conventional front-end 100 of an FMCW radar system. The front-end 100 is configured to receive an FMCW chirp 110 which is passed to a power amplifier (PA) 120 and to a buffer 130. The PA 120 amplifies the FMCW chirp before it is transmitted by transmit antenna 140.

The front-end 100 is also configured to receive reflected radar signals or echoes at a receive antenna 150, the received signals or echoes being amplified by a low-noise amplifier (LNA) 160 to generate amplified received signals or echoes 165 which are then mixed in a mixer 170 with a reference chirp or signal 135 having a delay, $\tau_{BUFFER}$, due the buffer 130. The mixer 170 mixes the amplified received signals or echoes 165 with the reference chirp or signal 135 and outputs a signal 175 at intermediate frequency (IF) for further processing (not shown).

A leakage path 180 is present between the transmit antenna 140 and the receive antenna 150 and which comprises a delay due to the power amplifier 120, $\tau_{PA}$, a delay due to the leakage, $\tau_{Leakage}$, and a delay due to the LNA 160, $\tau_{LNA}$. The signal in the leakage path is correlated with the reference signal 135 in the mixer 170 resulting in a beat frequency at IF in the IF signal 175.

The leakage path 180 is present irrespective of whether a target is within the field-of-view of the front-end 100 of a radar system and reflects the transmit signal from the transmit antenna as a reflected signal to the receive antenna 150. Leakage compensation may still be made at any time the transmit antenna 140 and the receive antenna 150 are operating to allow or compensate for any leakage between the transmit antenna and the receive antenna.

Figure 2A:
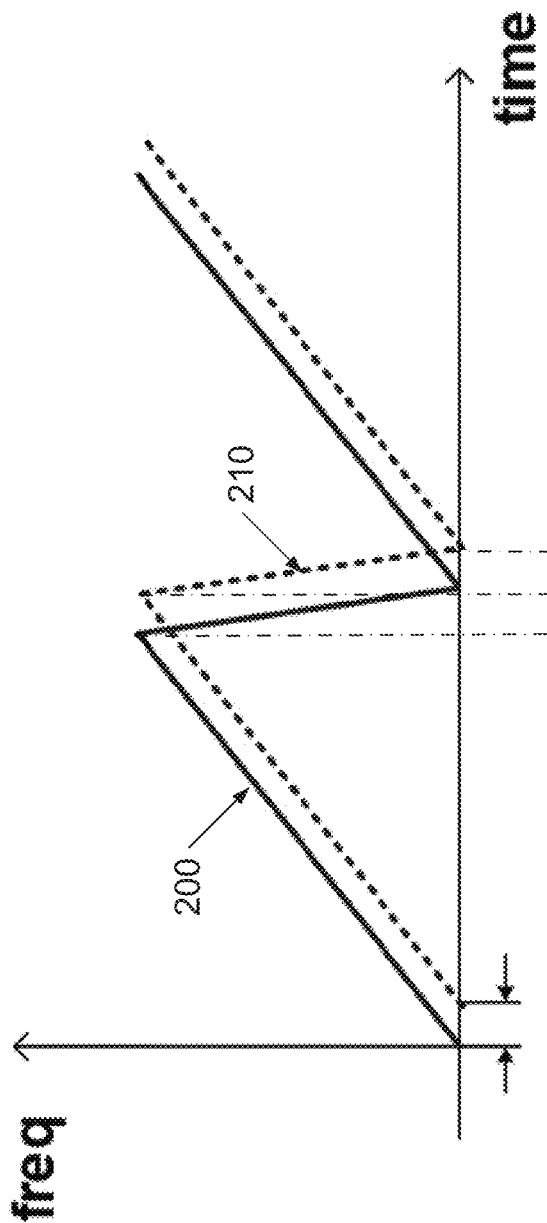
FIG. 2A illustrates the effect of leakage at the receiver of a FMCW radar system.

FIG. 2A illustrates the interaction of a reference chirp 200 (full line) from the buffer 130 and the transmitter leakage signal 210 (dotted line). The offset between the reference chirp 200 and the transmitter leakage signal 210 can be expressed as:

$$\tau_{PA}+\tau_{Leakage}+\tau_{LNA}-\tau_{BUFFER}$$

Figure 2B:
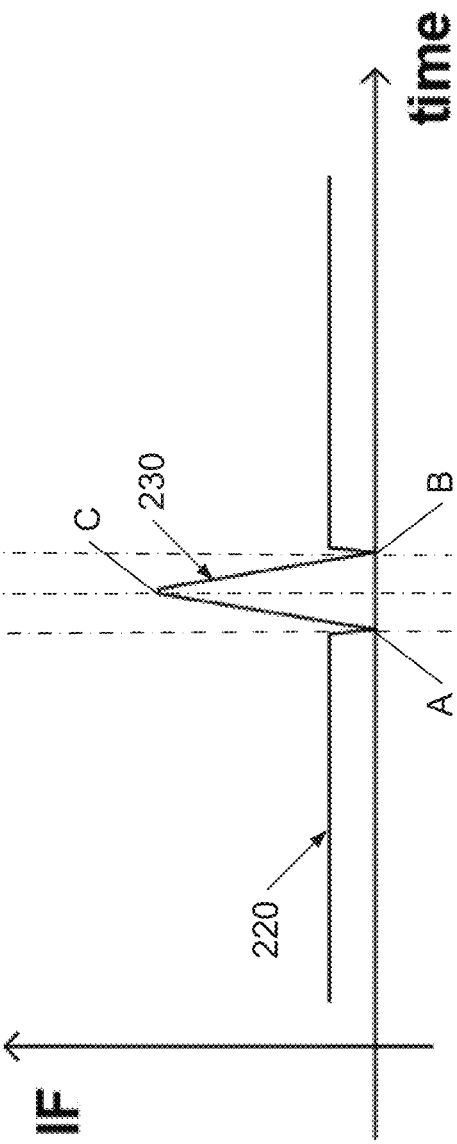
FIG. 2B illustrates the effect of leakage at the receiver of a FMCW radar system.

Delays due to the PA 120 and the LNA 160 shift the leakage-beat into the passband of the receiver as shown in FIG. 2B. Here, the constant frequency IF 220 (corresponding to the leakage signal) and has a spike 230 where there is overlap between the reference chirp 200 and the transmitter leakage signal 210. In particular, at point A, the reference chirp 200 and the transmitter leakage signal 210 overlap at the same frequency value and therefore cancel one another out, resulting in an IF value at 0 Hz. Similarly, at point B, the reference chirp 200 and the transmitter leakage signal 210 cancel one another out due to overlap at the same frequency value. However, at point C, there is no cancellation and therefore there is an increased IF value which is greater than the constant frequency IF 220. However, the constant frequency IF should be at zero and both the constant frequency IF 220 and the spike 230 may be undesirable and may be removed.

In accordance with the present disclosure, the transmitter-leakage comprises a two-step approach. In a first step, the delays of the PA, LNA, and leakage are compensated in the receive path which results in a DC component at IF. In a second step, the DC component is filtered out using a leakage suppression filter. This leakage suppression filter includes DC-offset suppression circuitry and may also have high-pass filter characteristics (as described in more detail below with reference to FIG. 6). If compensation is not ideal, the DC-offset suppression may not be sufficient, and by including high-pass filter characteristics, any remaining low frequency components (remaining leakage) can be suppressed.

Figure 3A:
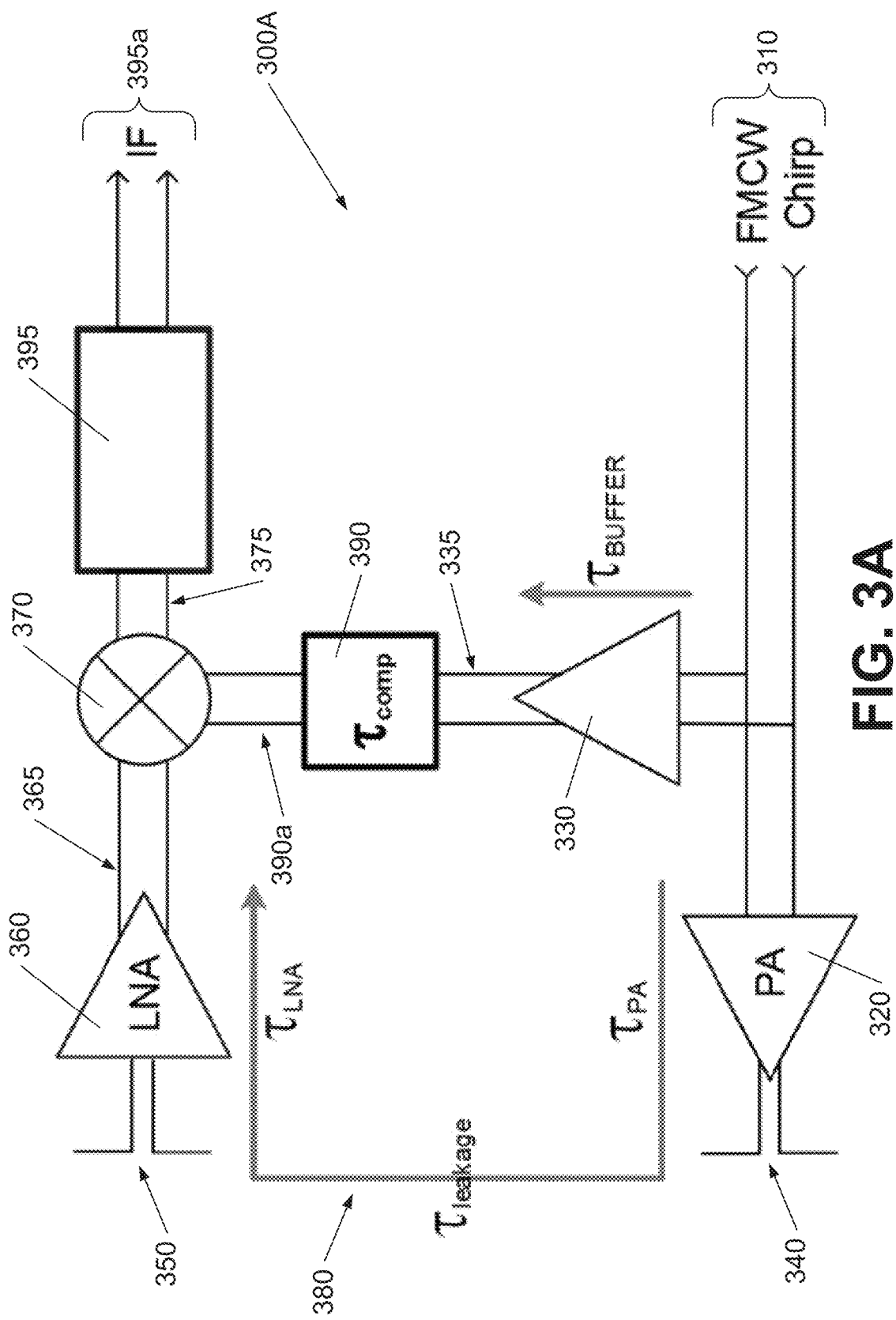
FIG. 3A illustrates a schematic diagram of a front-end of an FMCW radar system, according to example embodiments.

FIG. 3A illustrates a schematic diagram of a first embodiment of a front-end 300A of an FMCW radar system in accordance with the present disclosure. The front-end 300A is configured to receive an FMCW chirp 310 as described above with reference to FIG. 1. The PA 320 amplifies the FMCW chirp 310 before it is transmitted by transmit antenna 340.

The front-end 300A is also configured to receive reflected radar signals or reflections at a receive antenna 350, the received signals or reflections being amplified by a LNA 360 to generate amplified received signals or reflections 365 before being mixed in a mixer 370 with a reference signal. The reflected radar signals or reflections also include leakage signals from the transmit antenna 340.

As described above with reference to FIG. 1, a leakage path 380 is present between the transmit antenna 340 and the receive antenna 350 and which comprises a delay due to the power amplifier 320, $\tau_{PA}$, a delay due to the leakage 380, $\tau_{Leakage}$, and a delay due to the LNA 360, $\tau_{LNA}$.

In accordance with the first embodiment of the present disclosure, the reference signal comprises a compensated signal 390a which has a delay compensating for the delay due to the power amplifier 320, $\tau_{PA}$, a delay due to the leakage 380, $\tau_{Leakage}$, an a delay due to the LNA 360, $\tau_{LNA}$, as described above. The compensated signal 390a is generated in a compensation unit 390 from output 335 from the buffer 330 and compensates for all delays in the front-end. The compensating delay, $\tau_{comp}$, can be expressed as:

$$\tau_{comp}=\tau_{PA}+\tau_{Leakage}+\tau_{LNA}-\tau_{BUFFER}$$

This is the same as the offset between the reference chirp 200 and the transmit leakage 210 as described above with reference to FIG. 2A.

The FMCW chirp 310 may be expressed as:

$$A_1 \cos(\omega_c t + f(t) + \emptyset_n(t))$$

where $\omega_c$ is the carrier frequency,
f(t) is the modulating signal generating the frequency chirp, and
$\emptyset_n(t)$ is the phase noise.

The amplified received signal (RF signal) 365 received at the mixer 370 can be expressed as:

$$A_2 \cos(\omega_c(t-\tau_{total})+f(t-\tau_{total})+\emptyset_n(t-\tau_{total}))+N_{PA,LNA}$$

where the total delay, $\tau_{total}$, can be expressed as:

$$\tau_{total}=\tau_{LNA}+\tau_{PA}+\tau_{leakage}$$

and $N_{PA,LNA}$ is excess thermal noise from the PA 320 and the LNA 360.

The delay compensated signal 390a as applied as the reference signal to the mixer 370 can be expressed as:

$$A_3 \cos(\omega_c(t-\tau_{ref})+f(t-\tau_{ref})+\emptyset_n(t-\tau_{ref}))+N_{BUFFER}$$

where the delay to the reference signal, $\tau_{ref}$, can be expressed as:

$$\tau_{ref}=\tau_{comp}+\tau_{buffer}$$

and $N_{BUFFER}$ is the excess thermal noise from the buffer 330.

After multiplying the amplified received signal (RF signal) and the delay compensated reference signal 390a in the mixer 370 (together with optional low-pass filtering (not shown in FIG. 3)), the leakage beat is shifted to DC and the phase-noise associated with it is canceled out. The residual thermal noise from the LNA 360, the PA 320 and the buffer 330 determine the receiver noise value. Of these three components, the noise from the LNA 360 and the buffer 330 dominate as the noise from the PA 320 is attenuated by the leakage path loss.

Therefore, the compensated signal 390a can be used to compensate for the delay in the amplified received signal 365, and, also to compensate for phase noise due to the PA 320 and the LNA 360.

The signal in the leakage path 380 is correlated with the reference signal 390a in the mixer 370 resulting an output signal 375 which has a DC component at IF as described below with reference to FIG. 4B.

In accordance with the present disclosure, the DC component is then filtered from the output signal 375 from the mixer 370 in a leakage suppression filter 395 to provide an output signal 395a at IF in which the DC component has been removed.

The front-end as described with reference to FIG. 3A represents the ultimate aim of compensation where delay due to leakage is the same as the delay in the compensated reference signal, that is:

$$\tau_{ref} = \tau_{total}$$

where $f_{beat}$, in this embodiment, is shifted to DC and subsequently removed by DC-offset cancellation implemented in the leakage suppression filter 395.

Figure 3B:
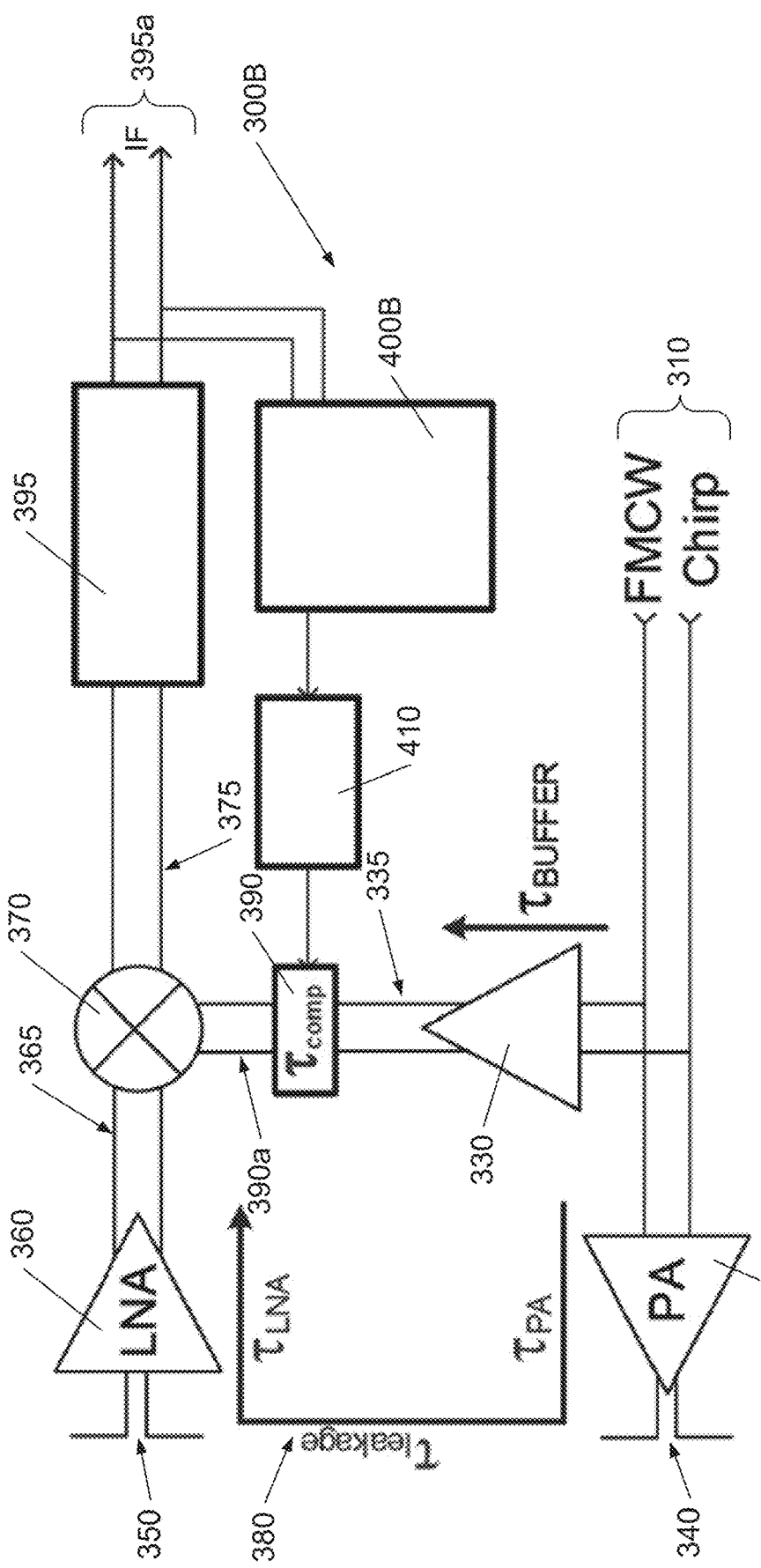
FIG. 3B illustrates a schematic diagram of a front-end of an FMCW radar system, according to example embodiments.
Figure 3C:
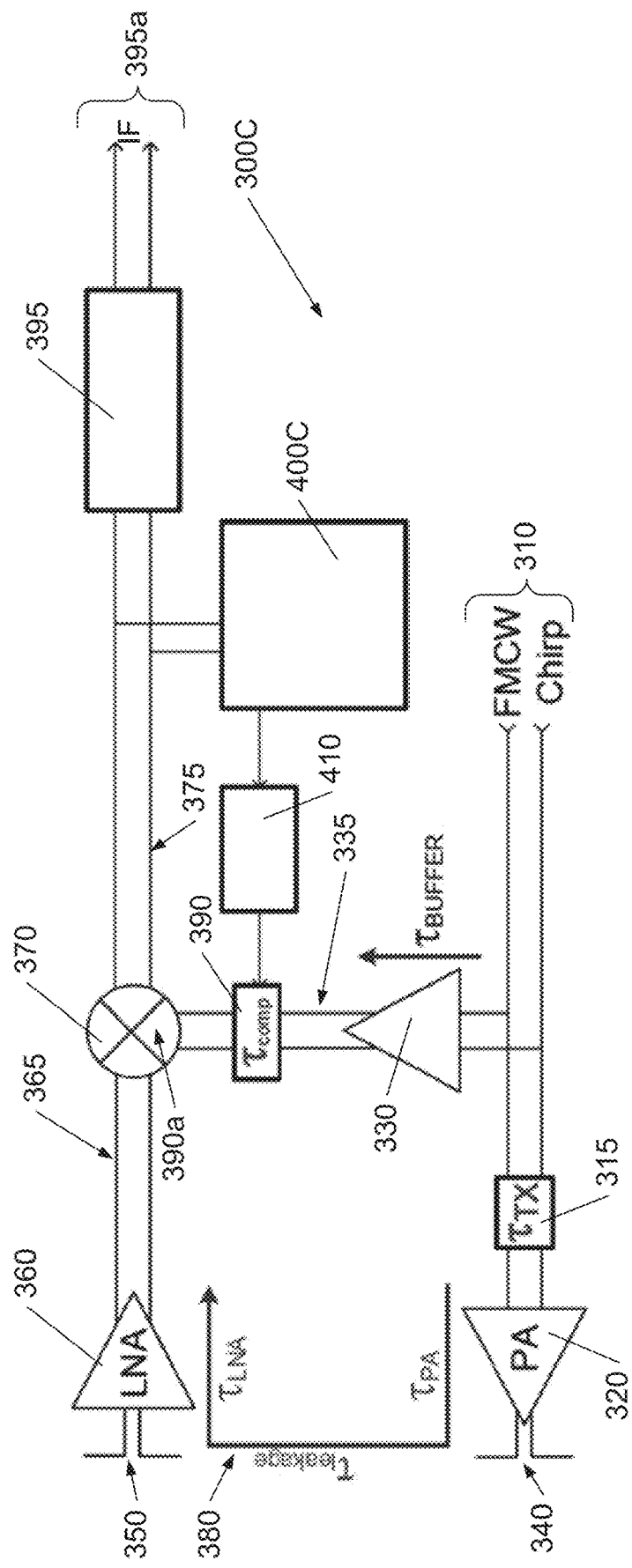
FIG. 3C illustrates a schematic diagram of a front-end of an FMCW radar system, according to example embodiments.

However, this is not always achievable without adaptive estimation. FIGS. 3B and 3C illustrate embodiments where the leakage delay can be compensated for by using a control loop which includes a power detector and a controller for updating the compensation unit 390.

FIG. 3B illustrates a schematic diagram of a second embodiment of a front-end 300B of an FMCW radar system in accordance with the present disclosure. Components described with reference to FIG. 3A are numbered the same and are not described again in detail.

The front-end 300A is configured to receive an FMCW chirp 310 as described above with reference to FIG. 1. The PA 320 amplifies the FMCW chirp 310 before it is transmitted by transmit antenna 340.

The front-end 300A is also configured to receive reflected radar signals at a receive antenna 350, the received reflected radar signals being amplified by a LNA 360 to generate amplified received signals or reflections 365 before being mixed in a mixer 370 with a reference signal. The reflected radar signals or reflections include leakage signals from the transmit antenna 340.

A leakage path 380 is present between the transmit antenna 340 and the receive antenna 350 and which comprises a delay due to the power amplifier 320, $\tau_{PA}$, a delay due to the propagation path of the leakage 380, $\tau_{Leakage}$, and a delay due to the LNA 360, $\tau_{LNA}$.

As described above with reference to FIG. 3A, the DC component is filtered from the output signal 375 from the mixer 370 in a leakage suppression filter 395 to provide an output signal 395a at IF in which the DC component has been removed.

However, in this embodiment:

$$\tau_{comp} < \tau_{total}$$

and $$f_{beat} > f_{ramp}$$

where the IF beat frequency, $f_{beat}$, is greater than the frequency of a modulating sawtooth or triangular waveform, $f_{ramp}$. In this case, the beat frequency comprises a continuous tone at IF with a power component at $f_{beat}$. Although a modulating sawtooth or triangular waveform is described, other waveforms may be implemented.

The front-end 300B therefore comprises a control loop including a power detector 400B and a controller 410. The power detector 400B is connected to receive output IF signals 395a from the leakage suppression filter 395 and which is configured for detecting the power component in the IF at $f_{beat}$. The controller 410 is provided for receiving an output signal from the power detector 400B and for generating an adaptive delay for the compensation unit 390.

Here, the total compensation delay, $\tau_{ref\_path}$, can be expressed as:

$$\tau_{ref\_path} = \tau_{comp\_fixed} + \tau_{comp\_adapt}$$

where $\tau_{comp\_fixed}$ corresponds to a fixed delay used to bring the power component at $f_{ramp}$ to DC and $f_{comp\_adapt}$ corresponds to an adaptive delay used to shift $f_{beat}$ to $f_{ramp}$. $\tau_{comp\_adapt}$ is determined in accordance with the detected power component in the IF at $f_{ramp}$.

The adaptive delay, $\tau_{comp\_adapt}$, corresponds to the delay used to shift the power component in the IF at $f_{beat}$ to $f_{ramp}$. In effect, the power detector 400B determines a maximum power component at $f_{ramp}$ together with a corresponding delay, $\tau_{comp\_adapt}$. By determining the power component at one frequency point, such as, $f_{ramp}$, the adaptive delay, $\tau_{comp\_adapt}$, can also be determined.

The fixed delay, $\tau_{comp\_fixed}$, is determined mathematically based on the bandwidth of the FMCW chirp 310 and $f_{ramp}$. The implementation of the mathematical determination of the fixed delay, $\tau_{comp\_fixed}$, may be a standardized technique and, as such, will not be discussed further here. The fixed delay, $\tau_{comp\_fixed}$, once determined, is pre-programmed on a radar chip for an FMCW radar system.

FIG. 3C is similar to FIG. 3B but illustrates a third embodiment of a front-end 300C where power detector 400C is connected to receive output signals 375 from the mixer 370 instead of IF 395a from the leakage suppression filter 395. A delay unit 315 is provided in the transmit path prior to the PA 320 and imparts a delay of $\tau_{tx\_path}$ to the transmit signal.

In this embodiment:

$$\tau_{comp} < \tau_{total}$$

and $$f_{beat} < f_{ramp}$$

As the beat frequency, $f_{beat}$, is less than $f_{ramp}$, the beat signal will not be able to complete a cycle within one modulation period. Therefore, the low frequency beat signal is gated or sampled at $f_{ramp}$. This results in a DC component and frequency components at $f_{ramp}$ and its harmonics.

As described above with reference to FIG. 3B, the shifting of $f_{beat}$ to $f_{ramp}$ is necessary with the power detector 400C determining the maximum power at $f_{ramp}$ and the corresponding delay, $f_{comp\_adapt}$. However, in the embodiment shown in FIG. 3C, the delay unit 315 is used to shift $f_{beat}$ to $f_{ramp}$ by way of decrement of the delay in the reference branch, that is, the delay applied by way of compensation by compensation unit 390. Therefore, there is a delay unit 315 in the transmit path which is intended to compensate for the fixed delay and the other one in the transmit path which is intended to compensate for the adaptive delay. In effect, for implementation reasons:

$$\tau_{ref\_path} = \tau_{comp\_fixed}$$

and $$\tau_{tx\_path} = \tau_{comp\_adapt}$$

In a first step, the delay is varied so that the leakage beat falls at $f_{ramp}$. This is done by using a narrowband power detector at $f_{ramp}$. The delay is varied until the determined power at $f_{ramp}$ is at its maximum so that the corresponding adaptive delay, $\tau_{comp\_adapt}$, can be determined. In a second step, the delay used to bring the leakage to DC is determined mathematically based on the FMCW chirp duration and the beat frequency. This delay is referred to as the fixed delay, $\tau_{comp\_fixed}$.

When $f_{beat} < f_{ramp}$, adding delay in the transmit path shifts the leakage beat towards $f_{ramp}$. Adding delay in the transmit path is analogous to subtracting the delay in the reference path. Detecting peak power at $f_{ramp}$ ensures the leakage beat is shifted to the frequency $f_{ramp}$ and determines the corresponding delay, $\tau_{tx\_path}$, in the transmit path provided by the delay unit 315. The leakage beat is then shifted from $f_{ramp}$ to DC using $\tau_{comp\_fixed}$ in the reference path.

Leakage is therefore entirely canceled as both components 220 and 230 as shown in FIGS. 2A and 2B are compensated by aligning $f_{beat}$ to $f_{ramp}$.

In the embodiment of FIG. 3C, the delay in the reference path is simply the fixed delay, $\tau_{comp\_fixed}$, and the adaptive delay, $\tau_{comp\_adapt}$, is removed by the delay unit 315 in the transmit path.

FIG. 4A is similar to FIG. 2B and illustrates a signal at IF 420 having a spike 430. This is the situation with no compensation in accordance with the present disclosure. FIG. 4B illustrates the situation when compensation is applied in accordance with the present disclosure which results in a DC component 440 at IF. As described above, the DC component is filtered out in the leakage suppression filter 395 to provide the output signal 395a at IF which is then passed for further processing.

Figure 5:
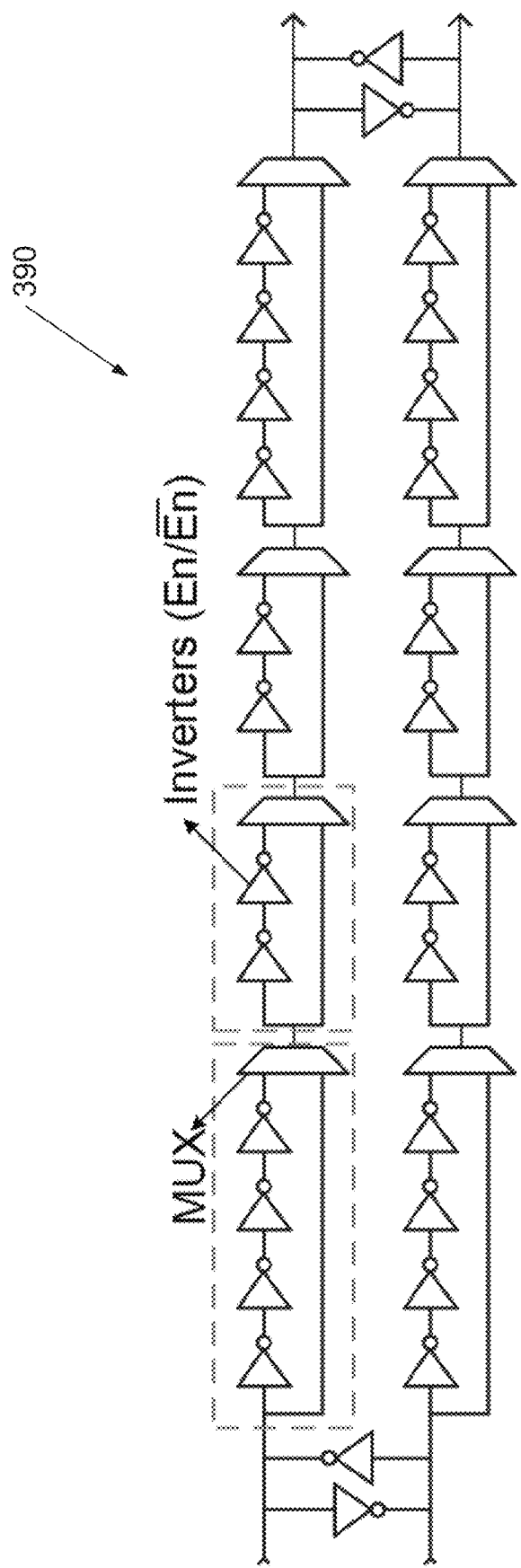
FIG. 5 illustrates a schematic diagram of a programmable delay, according to example embodiments.

FIG. 5 illustrates an implementation of a compensation unit 390 in accordance with the present disclosure which may be implemented as a programmable delay on a radar chip as described above. The compensation unit 390 comprises inverters and multiplexers. Components of such an implementation may be conventional and.

Figure 6:
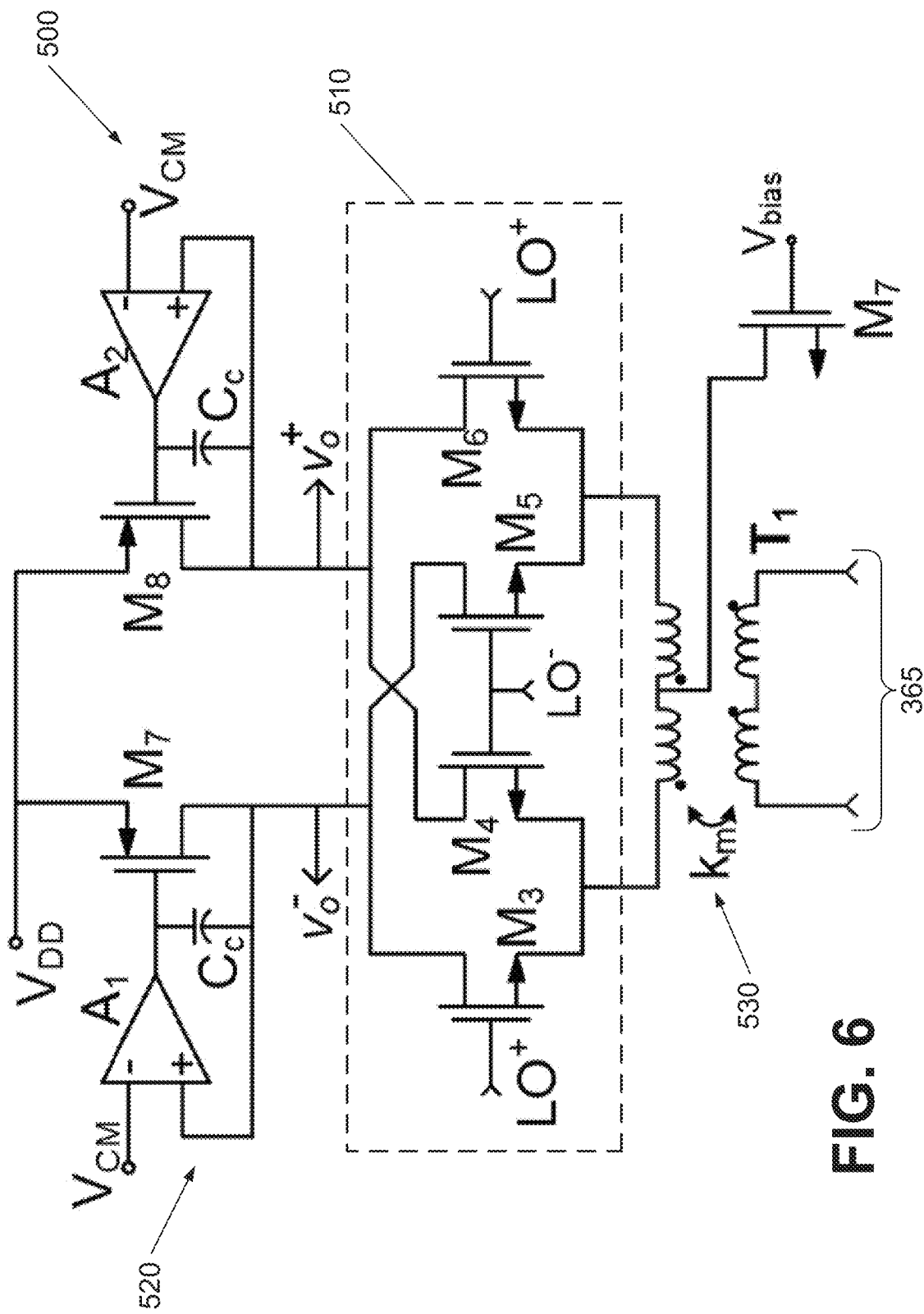
FIG. 6 illustrates a schematic diagram of a mixer-leakage suppression filter, according to example embodiments.

FIG. 6 illustrates an implementation of a combined mixer-DC suppression filter 500 which comprises two parts, namely, a mixer 510 (equivalent to mixer 370 in FIG. 3) applied to the output 365 from the LNA 360 (as shown in FIG. 3) and a DC suppression filter 520. As shown, the output 365 from the LNA 360 (as described above with reference to FIG. 3) is inductively coupled to the mixer 510 at 530. The mixer 510 is connected to the DC suppression filter 520 which may be implemented as a voltage regulation loop. Components of such an implementation may be conventional.

The embodiments of the present disclosure provide a robust method for leakage suppression based on peak power detection rather than on detecting low or diminishing power levels.

In accordance with the present disclosure, the components of the front-end may be implemented on an FMCW radar chip taped out in 28 nm CMOS.

The use of increasing frequencies results in smaller wavelengths and therefore smaller antenna sizes can be implemented. These antennas can be integrated on chip, which can be cost-effective and fully integrated. Applications using detection of gestures, people, and vital signs may include broadband radar systems, and, the present disclosure enables the design of integrated broadband radar systems.

What is claimed is:

1. A front-end for a radar system comprising:
   a transmit path comprising a power amplifier and a transmit antenna, wherein the transmit path is configured to transmit a transmit signal;
   a receive path comprising a receive antenna and a low-noise amplifier,
   wherein the receive path is configured to receive at least a leakage from the transmit path, and
   wherein the receive path is configured to generate an amplified signal of the leakage;
   a reference path derived from the transmit path and configured to generate a reference signal;
   a mixer configured to mix the amplified signal with the reference signal to generate an output signal at intermediate frequency;
   a compensation unit in the reference path,
   wherein the compensation unit is configured to generate compensation for a leakage path between the transmit path and the receive path, and
   wherein the compensation unit is configured to apply the generated compensation to the reference signal to generate a compensated reference signal; and
   a leakage suppression filter in the receive path, wherein the leakage suppression filter is configured to remove DC components in the output signal resulting from mixing the amplified signals with the compensated reference signal.

2. The front-end according to claim 1, wherein the compensation unit is further configured for compensating for delay in leakage propagation time due to at least the leakage between the transmit path and the receive path.

3. The front-end according to claim 1, further comprising a control loop configured to:
   determine maximum power at a modulating waveform frequency; and
   generate a corresponding adaptive delay due to the maximum power at the modulating waveform frequency,
   wherein the control loop comprises:
     a power detector configured to determine the maximum power; and
     a controller configured to adjust the compensation unit in accordance with the determined maximum power.

4. The front-end according to claim 3,
   wherein the control loop is configured to be connected between the compensation unit and the output from the leakage suppression filter, and
   wherein the compensation in the reference path comprises a fixed delay and an adaptive delay.

5. The front-end according to claim 3, further comprising a delay unit in the transmit path,
   wherein the delay unit is configured to apply a transmit delay to the transmit signal,
   wherein the control loop is configured to be connected between the compensation unit and the output from the mixer, and
   wherein the compensation in the reference path comprises a fixed delay and the transmit delay corresponds to the adaptive delay.

6. The front-end according to claim 1, wherein the compensation unit comprises a programmable delay.

7. The front-end according to claim 6, wherein the compensation unit comprises a circuit including inverters and multiplexers.

8. The front-end according to claim 1, wherein the leakage suppression filter is configured to suppress DC offsets and is configured to be combined with the mixer.

9. The front-end according to claim 8, wherein the leakage suppression filter is configured as a high pass filter.

10. The front-end according to claim 9, wherein the leakage suppression filter comprises a voltage regulation loop.

11. The front-end according to claim 1, wherein the front-end is implemented on a chip.

12. A radar system comprising a front-end, wherein the front-end comprises:
- a transmit path comprising a power amplifier and a transmit antenna, wherein the transmit path is configured to transmit a transmit signal;
- a receive path comprising a receive antenna and a low-noise amplifier,
- wherein the receive path is configured to receive at least a leakage from the transmit path, and
- wherein the receive path is configured to generate an amplified signal of the leakage;
- a reference path derived from the transmit path and configured to generate a reference signal;
- a mixer configured to mix the amplified signal with the reference signal to generate an output signal at intermediate frequency;
- a compensation unit in the reference path,
- wherein the compensation unit is configured to generate compensation for a leakage path between the transmit path and the receive path, and
- wherein the compensation unit is configured to apply the generated compensation to the reference signal to generate a compensated reference signal; and
- a leakage suppression filter in the receive path, wherein the leakage suppression filter is configured to remove DC components in the output signal resulting from mixing the amplified signals with the compensated reference signal.

13. The radar system according to claim 12, further comprising a frequency-modulated continuous wave radar system.

14. A method of cancelling transmitter leakage in a radar system, comprising:
- transmitting a transmit signal from a transmit path;
- receiving, by a receive path, at least a leakage from the transmit path;
- amplifying at least the leakage from the transmit path to generate an amplified signal;
- deriving a reference signal from the transmit path;
- mixing the amplified signal with the reference signal to generate an output signal at an intermediate frequency;
- deriving a delay corresponding to a leakage path between the transmit path and the receive path;
- generating a compensation for the derived delay;
- applying the generated compensation to the reference signal; and
- removing DC components from the output signal.

15. The method according to claim 14, further comprising compensating for delay due to at least leakage propagation time between the transmit path and the receive path.

* * * * *